O. E. CLARK.
MOTOR FOR METERS.
APPLICATION FILED DEC. 12, 1912.

1,136,103.

Patented Apr. 20, 1915.
5 SHEETS—SHEET 1.

WITNESSES

INVENTOR
O. E. Clark
by
Attorney

O. E. CLARK.
MOTOR FOR METERS.
APPLICATION FILED DEC. 12, 1912.

1,136,103.

Patented Apr. 20, 1915.
5 SHEETS—SHEET 2.

O. E. CLARK.
MOTOR FOR METERS.
APPLICATION FILED DEC. 12, 1912.
1,136,103.
Patented Apr. 20, 1915.
5 SHEETS—SHEET 3.
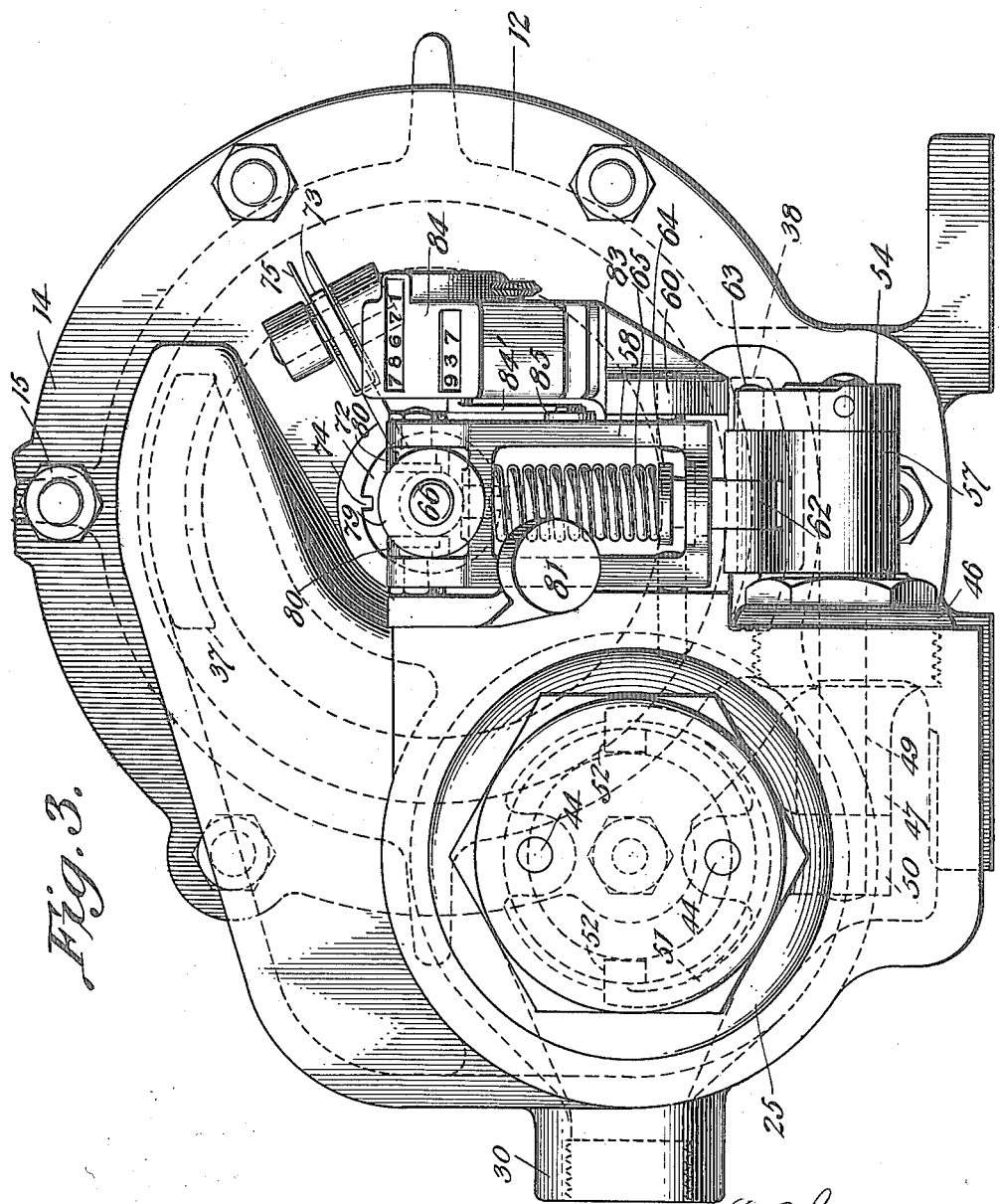
Fig. 3.
WITNESSES
INVENTOR
Attorney

O. E. CLARK.
MOTOR FOR METERS.
APPLICATION FILED DEC. 12, 1912.

1,136,103.

Patented Apr. 20, 1915.
5 SHEETS—SHEET 4.

WITNESSES
INVENTOR
Attorney

O. E. CLARK.
MOTOR FOR METERS.
APPLICATION FILED DEC. 12, 1912.
1,136,103.
Patented Apr. 20, 1915.
5 SHEETS—SHEET 5.
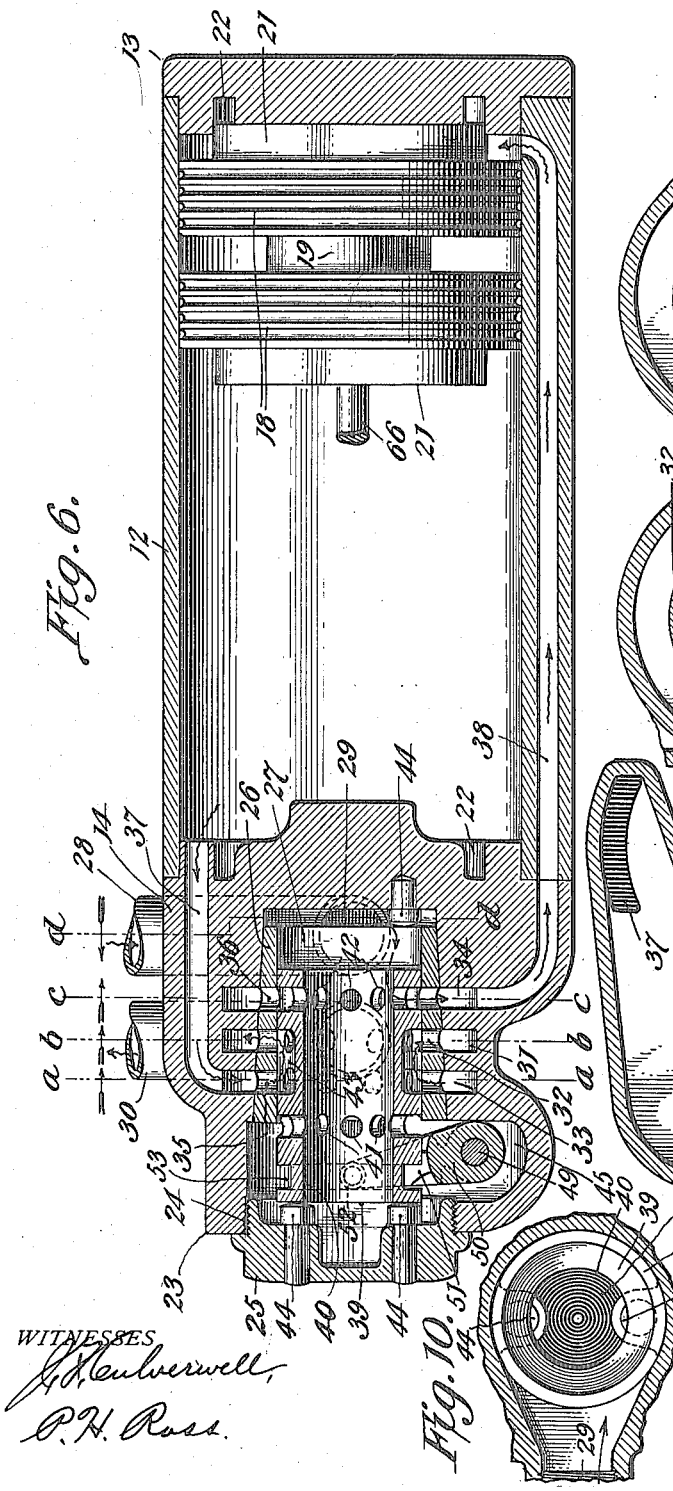

UNITED STATES PATENT OFFICE.

OMAR E. CLARK, OF DENVER, COLORADO, ASSIGNOR, BY MESNE ASSIGNMENTS, TO THE DENVER ROCK DRILL MANUFACTURING COMPANY, OF DENVER, COLORADO, A CORPORATION OF DELAWARE.

MOTOR FOR METERS.

1,136,103.  Specification of Letters Patent.  Patented Apr. 20, 1915.

Application filed December 12, 1912. Serial No. 736,346.

*To all whom it may concern:*

Be it known that I, OMAR E. CLARK, a citizen of the United States, residing at Denver, in the county of Denver and State of Colorado, have invented new and useful Improvements in Motors for Meters, of which the following is a specification.

The present invention relates to motors for meters, and in its present embodiment, is particularly adapted for measuring expansible fluids, such as air under pressure.

The primary object is to provide a motor of the piston type, which will accurately register the amount of air passing through the same, irrespective of the speed or volume and is so constructed that it requires very little energy to effect the operation of the parts and the actuation of the registering mechanism.

An embodiment of the invention, which is at present considered preferable is illustrated in the accompanying drawings, wherein:—

Figure 1:
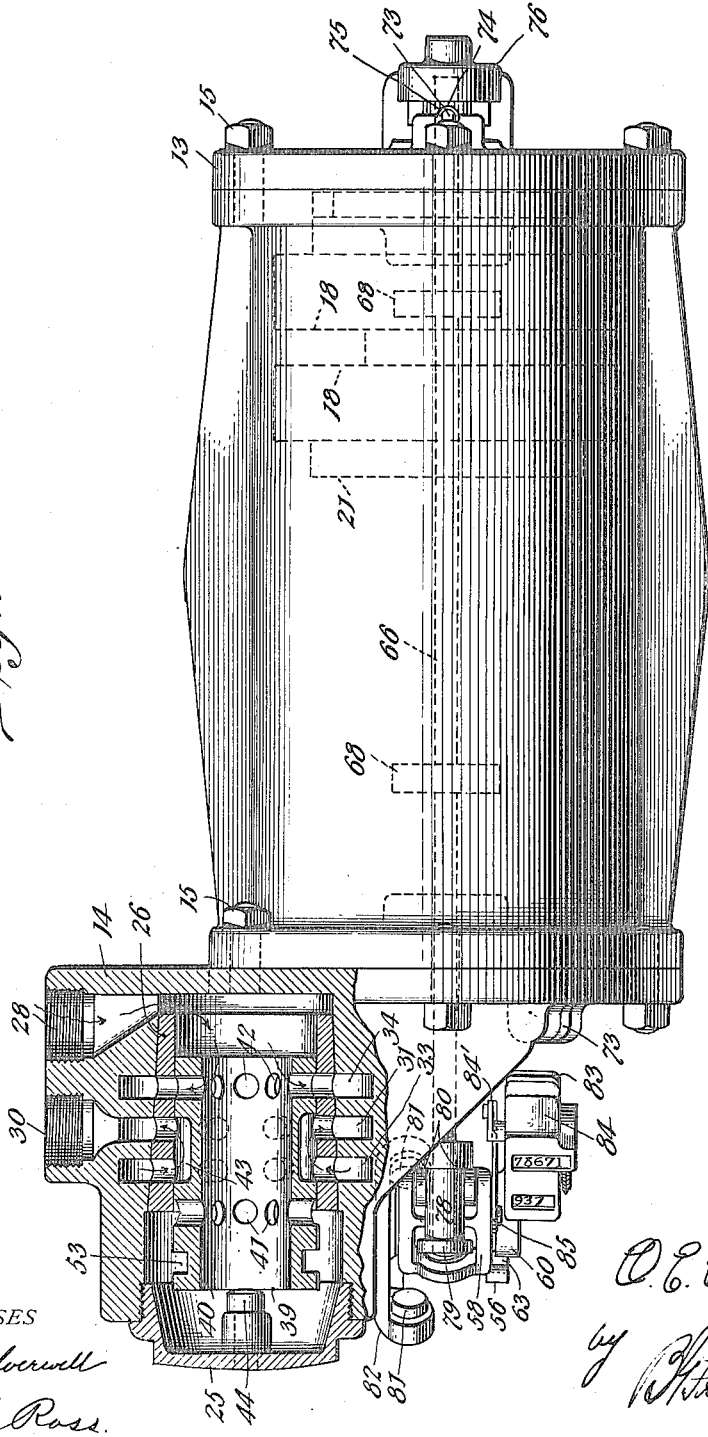
Figure 2:
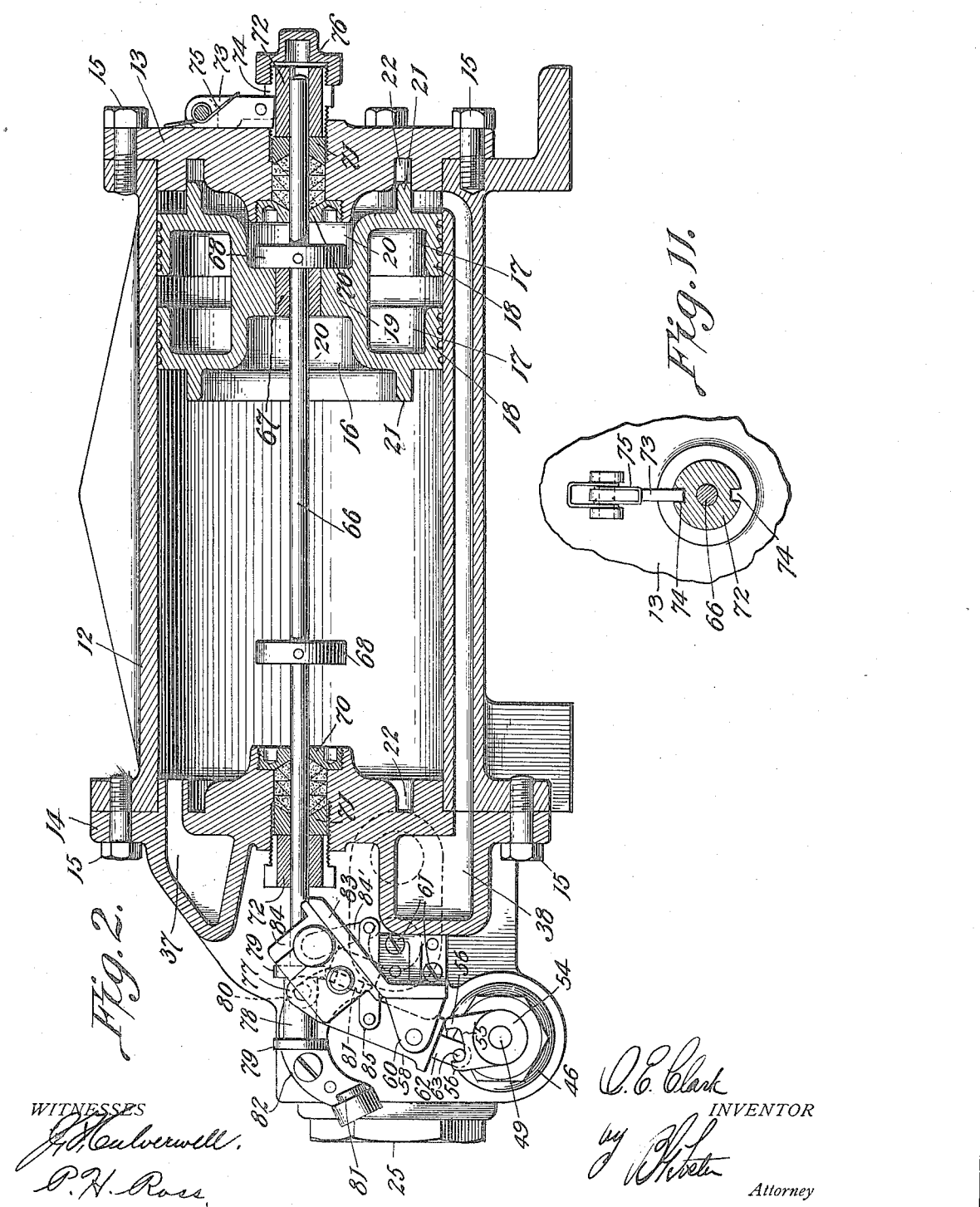
Figures 4, 5:
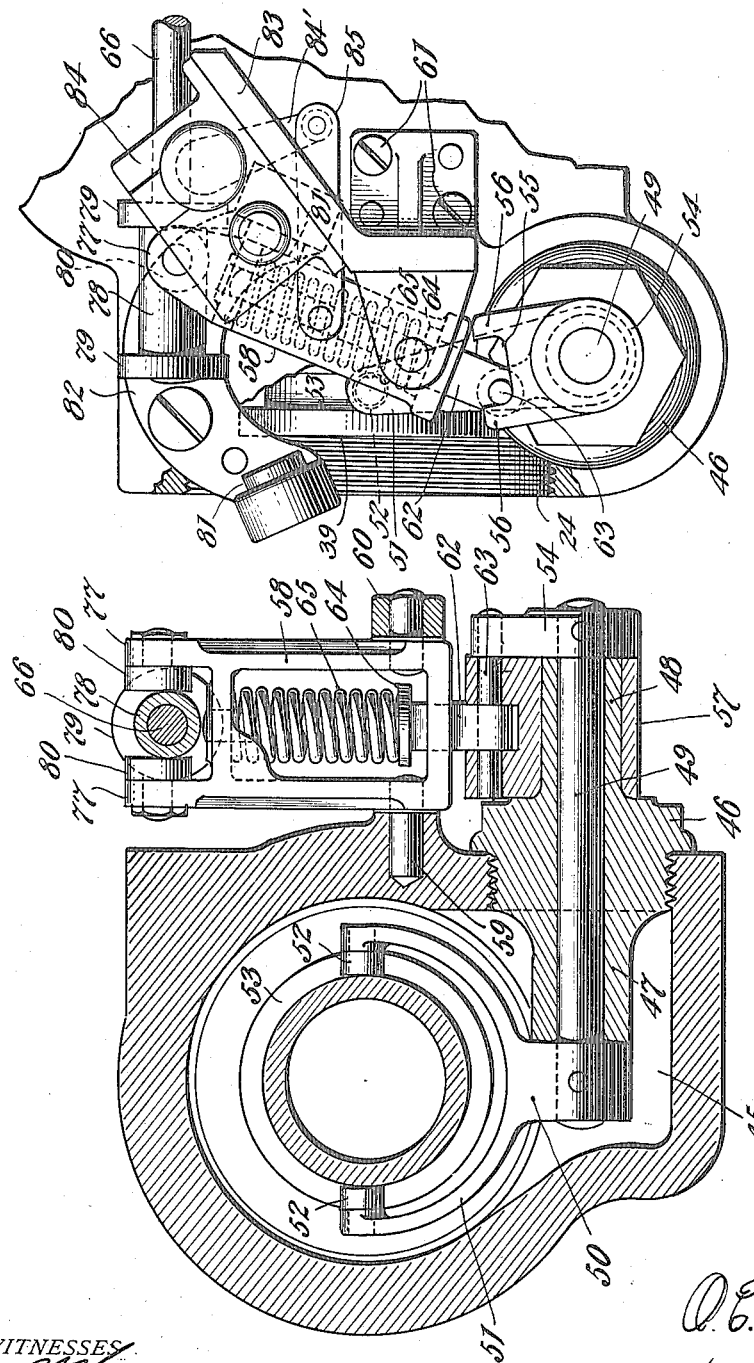

Figure 1 is a plan view of the meter, with the valve mechanism shown in horizontal section. Fig. 2 is a vertical sectional view through the cylinder and piston members. Fig. 3 is an end elevation on an enlarged scale. Fig. 4 is a cross sectional view through the valve and its actuating means. Fig. 5 is a side elevation of the valve actuating mechanism. Fig. 6 is a longitudinal sectional view in different planes and is diagrammatic in its character, in order to show the various passages and ports and thereby illustrate their relation. Figs. 7, 8, 9 and 10 are detail sectional views, respectively on the line A—A, B—B, C—C and D—D of Fig. 6, looking in the directions of the arrows. Fig. 11 is a detail sectional view showing the locking means for one of the packing glands.

Similar reference numerals designate corresponding parts in all the figures of the drawings.

In the embodiment illustrated, a cylinder member 12 is employed, having heads 13 and 14 secured to its opposite ends by suitable screw bolts 15, or other desirable means. Operating in the cylinder member, is a piston member 16 that is in the form of a shell comprising two disk sections 17 spaced apart and having circular bearing flanges 18, suitably packed and operating against the cylinder member. These sections are connected by a neck portion 19, and each section is furthermore hollowed out at its center, as illustrated at 20. As a result, a light, but very strong piston is produced. Each of the sections 17 furthermore has an outstanding circular flange 21 that is adapted to enter correspondingly shaped grooves 22 formed in the inner faces of the heads 13 and 14, thereby producing cushions at the ends of the piston stroke.

The cylinder head 14 is extended at one side of its center into a valve casing 23 that has an outer opening 24 closed by a suitable plug 25 threaded thereinto. In this valve casing is located a tapered bushing 26, the interior of which constitutes a valve chamber 27. The fluid to be measured is supplied to the meter by a conduit 28 having communication, as shown at 29 with one end of the valve chamber, and the fluid is carried away from the meter by means of a conduit 30 in communication with an annular groove 31 formed in the valve casing, and communicating with the valve chamber through a series of radial ports 32. On opposite sides of the groove 31 are formed other grooves 33 and 34 that are also in communication with the valve chamber 27 on opposite sides of the ports 32 by means of corresponding ports 35 and 36 formed in the bushing. The groove 33 is in communication with one end of the cylinder member on one side of the piston by means of a passageway 37, and the other groove 34 is in communication with the other end of the cylinder on the opposite side of the piston by means of a passageway 38.

A reciprocatory valve 39 operates in the valve chamber and is tubular in form, the bore 40 thereof being open-ended. This valve is so constructed that the pressure areas or surfaces in opposition to each other are equal in extent, so that the valve is balanced, and it will be evident that the fluid under pressure, entering through the conduit 28, can pass freely through this valve, so that the pressure of said fluid will be equal at all times on the opposing surfaces. There is therefore nothing, in so far as the fluid pressure is concerned to oppose an easy movement of the valve in either direction. This valve is provided in its end portions with two series of radial ports, designated respectively, 41 and 42, so arranged that one series, as 41, will register with the ports 35 when the valve is in one position, and the other series, as 42, will register with the ports 36, when the valve is in its opposite position, namely, that shown in Figs. 1 and 6. This valve is furthermore provided between the two series of ports with a peripheral groove 43 that is always in communication with the ports 32, and consequently the annular groove 31, and alternately moves into communication with the ports 35 and 36, when the valve is shifted to its opposite positions.

With the structure as thus far described, it will be evident that if the valve is in the position illustrated in Figs. 1 and 6, the fluid under pressure from the conduit 28 will enter through the port 29, flow into the bore 40 of the valve, thence pass through the ports 42 and 36 into the annular groove 34. From this groove, it will flow through the passageways 38, and into one end of the cylinder. Here it will operate against the piston 16, and move it to the opposite end of the cylinder. This movement of the piston can take place, for the fluid behind the same will pass out through the passageway 37, thence through the groove 33 and ports 35, into the groove 43. It will escape through said groove 43 into the groove 31, and finds an outlet through the conduit 30. As the piston 16 approaches the limit of movement in the opposite direction, the valve will be shifted by mechanism hereinafter explained, and the ports 41 will now be brought into register with the ports 35. Consequently, the fluid under pressure will pass into the groove 33, and thence through the passageway 37 into the opposite end of the cylinder member. At the same time, the peripheral groove 43 of the valve will connect the ports 36 and 32, so that the air will now flow out through the passageway 38, the grooves 34, 43 and 32, and thence into the conduit 30. In order to definitely limit the travel of valve 39 in its movements, solid or fixed bumpers or pads 44 are located in the path of the said valve at the opposite ends thereof.

In order to secure the proper operation of the valve, the following mechanism has proven very satisfactory. The lower side of the valve casing is chambered, as illustrated at 45, in Fig. 4, and a plug 46 is threaded into the wall of this casing, said plug having a projection 47 extending into the casing, and having a hub 48 projecting outwardly therefrom. A rock shaft 49 is journaled in this plug, and secured to the inner end of the rock shaft, is an arm 50, terminating in a yoke 51 that embraces the valve, and has journaled thereon rollers 52 engaged in a peripheral groove 53 formed on one end of said valve. The outer end of the rock shaft 49 is provided with a short and comparatively wide arm 54, having its upper end cut away, as illustrated at 55, to provide a pair of spaced oppositely disposed shoulders 56. Journaled on the hub 48, alongside the arm 54, is a swinging toggle element 57. A stirrup 58 is pivoted as shown at 59 to one side of the valve casing, and to a bracket 60 fastened, as illustrated at 61 to said casing. Slidably mounted in this stirrup, is a plunger 62, the lower end of which has a pivotal connection 63 with the toggle element 57, and the pivot 63 is extended so as to lie between the shoulders 56, being arranged to engage the same, and yet to have lost motion between them, as will be evident by reference to Fig. 5. The plunger 62 is provided with a flange 64, against which bears a spring 65 that also bears against the upper portion of the stirrup.

Referring particularly to Fig. 2, it will be noted that the actuating rod 66 is arranged axially in the cylinder 12, slidably passing through the bearing thimble 67 formed in the center of the piston. Collars 68, fixed to this rod, are engaged by the piston in its travel, and are so arranged that the rod is moved by the piston in opposite directions, as said piston approaches the limit of its opposite movements. This rod extends through both the cylinder heads 13 and 14, and in said heads is surrounded by packing material. This packing material is confined between inner plugs 70, and outer glands 71. The glands are forced inwardly by screw plugs 72, and these screw plugs are held against accidental turning through the medium of pivoted latches 73 engaging in any of a plurality of slots 74 formed in the sides of the plugs. The latches are in turn held in position by springs 75. The plug on the rear cylinder head 13 preferably has a cap 76 screwed thereon. As will be evident by reference to Figs. 2 and 5, the rod projects above the rock shaft 49, and passes between a pair of upstanding ears 77 formed upon the upper end of the stirrup 58. This portion of the rod is provided with a head 78 having spaced flanges 79, and rollers 80, journaled on the inner sides of the ears 77, engage between the flanges. By reference to Fig. 5, it will be noted that the rod is permitted to have play with respect to the rollers, so that there is a certain amount of lost motion at this point. The swinging movement of the stirrup is limited, not only by the mechanism above described, but by oppositely disposed buffers 81 carried by a plate 82 fixed to the side of the valve casing.

The bracket 60, above described, is provided with an offset inclined plate portion 83, on which is mounted a register 84 that may be of any desired or well known type, this register having secured thereto, an actuating arm 84'. A link 85, pivoted to the arm and to the stirrup 58, affords connection between these two parts that insures the operation of the register upon the actuation of said stirrup.

To briefly describe the operation of the valve, with the parts in the position shown in Figs. 2 and 6, it will be evident that as the piston travels to the left, it will move freely with respect to all the mechanism until it engages the left hand collar 68 on the rod 66. When so engaged, the said rod will of course be moved longitudinally with the piston. As a result the stirrup 58 will be swung toward the left and the toggle element 57 will cause the pivot 63 to ride upward toward the right until it has passed the vertical position a certain predetermined distance, at which point in its travel the recoil action of the spring takes place and at the same point the projecting end of said pivot element 63 strikes the right hand shoulder 56 of the arm 54. This motion is transmitted through the rock shaft 49 and yoke 50 to valve 39. It will be seen that the first half of the travel of the toggle element 57 is caused by the impulse of the piston 16 when it comes in contact with collar 68 and carries with it rod 66 and this in turn transmits motion to stirrup 58 until stirrup 58 and toggle element 57 have passed the vertical position as above described. At this point, the reaction of spring 65 takes place, thus causing an instantaneous automatic swinging movement of arm 54 and of stirrup 58 entirely independent of the piston 16.

The space between the flanges 79 of head 78 is to allow for that portion of stroke of stirrup 58 which is produced by the spring and to allow for the instantaneous movement of stirrup from the vertical position to the end of its travel in either position, thereby reversing the flow of the fluid, as above described, causing the piston to return. As said piston approaches the limit of its return movement, it will engage the other or right hand collar 68, thereby shifting the actuating rod 66 to the right and causing a reversal of the operation above described. When this structure therefore has been calibrated there is a fixed displacement of the fluid that cannot vary, and consequently an accurate measurement of the fluid is secured. Furthermore there is no dead center, and no point in the stroke of the piston or of the valve when the fluid can pass through the meter (no matter at what speed it is run), without moving the piston, and this must necessarily change the valve at the end of each stroke, each stroke in turn being recorded on the counter or register.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new and desire to secure by Letters Patent, is:—

1. In a motor of the character set forth, the combination with a cylinder member and a piston operating therein, of a valve casing having a valve chamber and passageways leading from different portions of the chamber to opposite end portions of the cylinder member, conduits for conducting fluid to and from the valve casing, a reciprocatory valve operating in the chamber and having an open interior in communication with one conduit and having spaced ports that alternately communicate with the passageways, said valve furthermore having a groove that is in constant communication with the other conduit and alternately in communication with the said passageways, and means controlled by the movement of the piston for shifting the valve.

2. In a motor of the character set forth, the combination with a cylinder member and a piston operating therein, of a valve casing having a valve chamber and passageways leading from different portions of the chamber to opposite end portions of the cylinder member, conduits for conducting fluid from and to the valve chamber, a reciprocatory open-ended tubular valve operating in the chamber and having its interior in constant communication with one conduit, said valve having spaced transverse ports extending through the same and alternately communicating with the passageways and being furthermore provided between the ports with an external groove that is in constant communication with the other conduit and alternately communicates with the said passageways, and means controlled by the movement of the piston for shifting the valve.

3. In a motor of the character set forth, the combination with a cylinder member and a reciprocatory piston operating therein, of a valve casing located at one end of the cylinder member and having an internal valve chamber, said chamber having three spaced peripheral grooves therein, passageways leading from the end grooves to the cylinder member on opposite sides of the piston, a conduit communicating with one end portion of the valve chamber, another conduit communicating with the intermediate groove, a reciprocatory open-ended tubular valve operating in the valve chamber, two series of spaced transverse ports opening through the valve and alternately communicating with the end grooves of the chamber, a peripheral groove between the ports that is in constant communication with the intermediate groove of the chamber and alternately communicates with the end groove, and means controlled by the movement of the piston for shifting the valve.

4. In a motor of the character set forth, the combination with a cylinder member having heads, of a piston member operating in the cylinder member, and means controlled by the movement of the piston member for delivering fluid on opposite sides of the same, said cylinder member heads and piston member being provided one with grooves and the other with flanges that engage in the grooves to provide fluid cushions at the ends of the piston stroke.

5. In a motor of the character set forth, the combination with a cylinder member having heads provided with substantially circular grooves in their inner sides, of a piston member operating in the cylinder member and having substantially circular flanges projecting from opposite faces and engaging in the grooves at the ends of the stroke to provide fluid cushions, and means controlled by the movement of the piston for delivering fluid on opposite sides of said piston.

6. In a motor of the character set forth, the combination with a cylinder member having heads, of a piston member operating in the cylinder member and comprising spaced sections and a neck portion connecting the same, and means controlled by the movement of the piston for delivering fluid on opposite sides of the piston member, each of said sections having an outstanding circular flange, heads for the cylinder member having corresponding grooves to receive the flanges at the ends of the piston stroke.

7. In a motor of the character set forth, the combination with a cylinder member and a piston operating therein, of a valve casing, a valve therein, a hub carried by the casing, a rock shaft journaled in the hub and connected to the valve, an arm mounted on the rock shaft, a swinging element journaled on the hub, and actuating means operated by the piston and having a connection with the element and an engagement with the arm.

8. In a motor of the character set forth, the combination with a cylinder member and a piston operating therein, of a valve casing, a valve in the casing, a hub carried by the casing, a rock shaft journaled in the hub and connected to the valve, an arm mounted on the outer end of the rock shaft, a swinging device journaled on the hub alongside the arm, a swinging stirrup located adjacent to the hub, means actuated by the piston for swinging the stirrup, and a spring-pressed plunger having a pivotal connection with the swinging device, said connection being extended to and having a lost motion engagement with the arm of the rock shaft.

In testimony whereof I have hereunto set my hand in presence of two subscribing witnesses.

OMAR E. CLARK.

Witnesses:
   JAS. R. EHURNDORF,
   H. E. FISKE.